United States Patent [19]

Economaki

[11] 4,453,618
[45] Jun. 12, 1984

[54] GREASE FITTING COVER AND LOCATOR

[76] Inventor: George Economaki, 3405 Crestmoore Pl., Des Moines, Iowa 50310

[21] Appl. No.: 299,480

[22] Filed: Sep. 4, 1981

[51] Int. Cl.³ .............................................. F16N 3/12
[52] U.S. Cl. .............................. 184/105 B; 184/88 A; 215/230; 220/306
[58] Field of Search ............... 184/105 B, 88 R, 88 A, 184/89, 92, 94; 215/230; 220/306, 305, 375

[56] References Cited

U.S. PATENT DOCUMENTS

| | | | |
|---|---|---|---|
| 1,626,268 | 4/1927 | Chipman | 184/88 R |
| 1,644,253 | 10/1927 | Johnson | 184/88 R |
| 2,371,900 | 3/1945 | Livermont | 220/306 |
| 2,379,529 | 7/1945 | Kennedy | 184/88 A |
| 2,430,441 | 11/1947 | Abramson | 184/88 R |
| 2,530,888 | 11/1950 | Marchelewicz | 184/88 A |
| 2,587,000 | 2/1952 | Schluter | 184/88 R |
| 2,599,472 | 6/1952 | Miller | 184/88 A |
| 2,921,708 | 1/1960 | Marcel | 215/230 |
| 3,006,510 | 10/1961 | Sagarin | 220/306 X |
| 3,147,824 | 9/1964 | Henderson | 184/88 R |
| 3,332,515 | 7/1967 | Borah | 184/88 A |
| 3,399,803 | 9/1968 | Oglevee et al. | 220/306 |
| 3,527,374 | 9/1970 | Thor | 220/306 |

FOREIGN PATENT DOCUMENTS

| | | | |
|---|---|---|---|
| 219895 | 2/1959 | Austria | 184/88 R |
| 1064125 | 12/1953 | France | 184/88 A |
| 494452 | 3/1954 | Italy | 215/317 |
| 624880 | 6/1949 | United Kingdom | 184/88 R |

Primary Examiner—David H. Brown
Attorney, Agent, or Firm—Zarley, McKee, Thomte, Voorhees & Sease

[57] ABSTRACT

A grease fitting cover and locator is comprised of a tubular member having an axially located aperture therein. A substantially large flange is mounted transversely on one end of the tubular member. Means to facilitate the grasping of the tubular member are provided on the surface thereof and comprises either an arcuate angular groove, a knurled surface, or a second flange spaced from the first-mentioned flange. The aperture has a diameter such that it will tightly fit on a grease fitting. The axial depth of the aperture is greater than the length of the grease fitting inserted therein so as to provide an air pocket in the closed end of the aperture. This air pocket creates a suction when the grease fitting cover and locator is removed, thus serving to maintain the device on the grease fitting. An indicia surface device may be placed on the flange to enhance the visibility or the identification thereof. Means are provided for placing an identifying tag on the flange if required.

1 Claim, 13 Drawing Figures

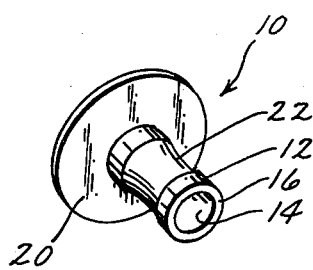
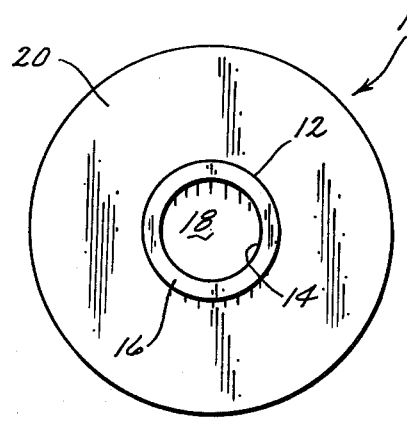
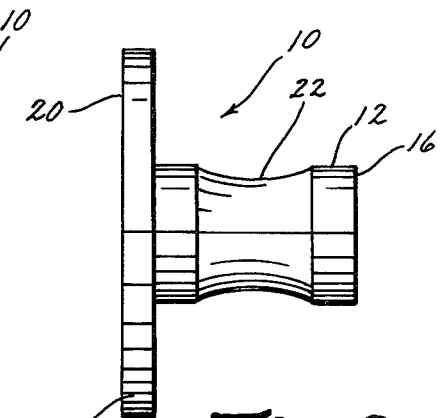
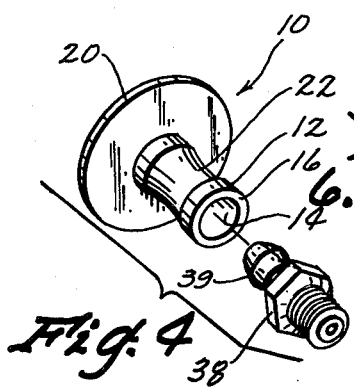
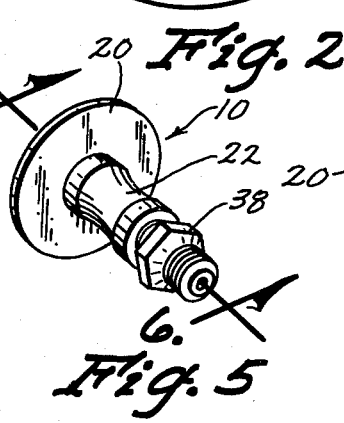
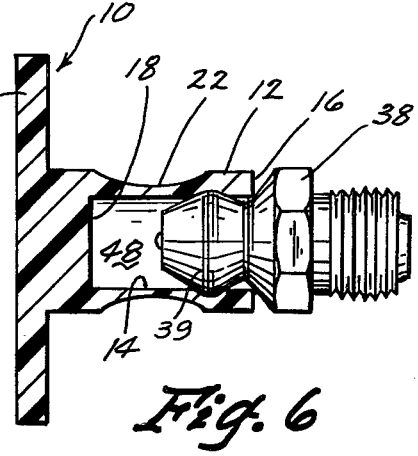
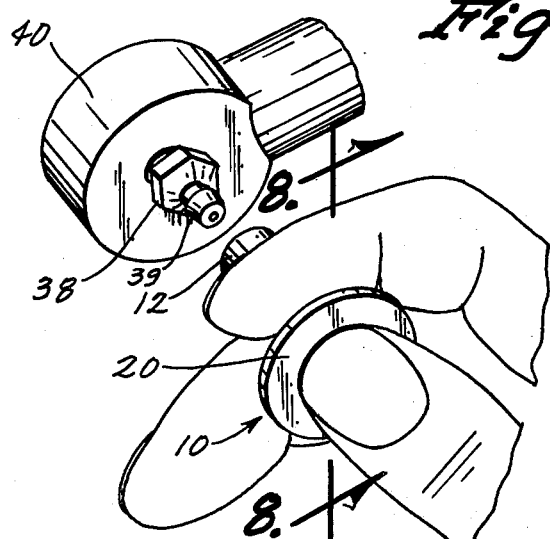
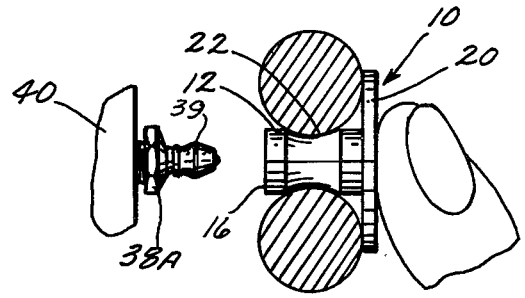
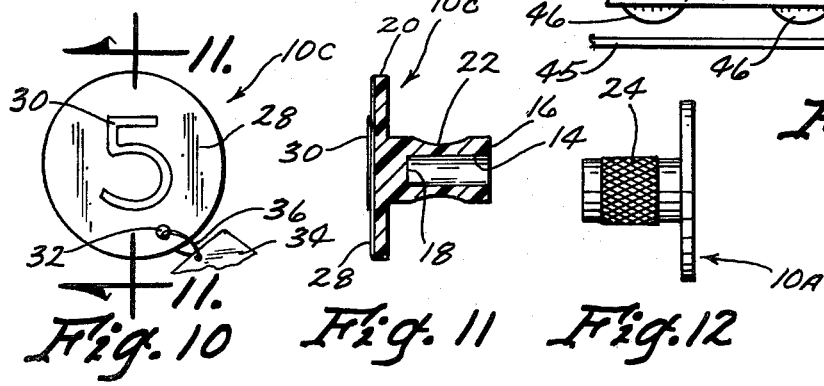
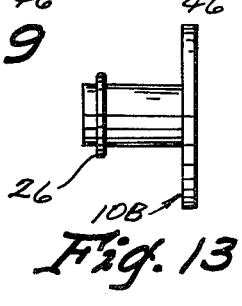

GREASE FITTING COVER AND LOCATOR

BACKGROUND OF THE INVENTION

When a dusty grease fitting is wiped off, a few grains of dust often remain on the tip of the fitting. When the grease gun is placed over the fitting and new grease is forced into the bearing cavity, this foreign material is forced into the bearing cavity along with the new grease. Under certain conditions, and over a period of time, this abrasive material can cause a bearing to fail.

Substantial time is consumed in industrial situations through searching for the location of grease fittings which are hidden by dust and dirt, and further time is consumed in trying to clean these grease fittings before the grease gun is placed thereon.

The grease covers of the prior art are difficult to grasp and hold and are relatively small, thus making them difficult to locate, particularly under dusty conditions. Many of the prior art grease covers are easily dislodged from the grease fittings.

It is, therefore, a principal object of this invention to provide a grease fitting cover and locator which is easily visible and identifiable without considerable searching, even under dusty and dirty conditions.

A further object of this invention is to provide a grease fitting cover and locator whereby grease fittings with different lubrication requirements can be coded through the colors or indicia marks on the device itself.

A further object of this invention is to provide a grease fitting cover and locator which can be easily manually removed from the grease fitting but which will not inadvertently become removed from the grease fitting through the operation of the machine upon which the grease fitting is mounted.

A further object of the invention is to provide a grease fitting cover and locator which can be easily and firmly held by the grease gun operator even though his hands may be greasy.

These and other objects will be apparent to those skilled in the art.

SUMMARY OF THE INVENTION

The grease fitting cover and locator of this invention is comprised of a tubular member having an axially located aperture located therein which is adapted to receive a grease fitting. A transversely outwardly extending flange is mounted on one end of the tubular member. This flange has a diameter substantially greater than that of the tubular member and should be of a bright color. An indicia surface may be placed on the flange to facilitate its location.

A gripping means is provided on the outer surface of the tubular member. The gripping means is comprised of an annular arcuate groove, a knurled surface, or a second flange spaced from the flange previously described.

BRIEF DESCRIPTION OF THE DRAWINGS

FIG. 1 is a perspective view of the device of this invention;

FIG. 2 is a front elevational view thereof shown at an enlarged scale;

FIG. 3 is a side elevational view thereof;

FIG. 4 is an exploded view of the device of FIG. 1 as it is about to be mounted on a grease fitting;

FIG. 5 is the device of FIG. 1 mounted on a grease fitting;

FIG. 6 is a sectional view taken on line 6—6 of FIG. 5 and shown at a larger scale;

FIG. 7 is a perspective view showing how the device of FIG. 1 is manually grasped to be placed on or removed from a grease fitting;

FIG. 8 is a sectional view taken on line 8—8 of FIG. 7;

FIG. 9 is an elevational view of an industrial conveyor utilizing the device of this invention;

FIG. 10 is an elevational view of a modified view of this invention;

FIG. 11 is a sectional view taken on line 11—11 of FIG. 10;

FIG. 12 is a side elevational view of a modified form of this invention; and

FIG. 13 is a side elevational view of a further alternate form of this invention.

DESCRIPTION OF THE PREFERRED EMBODIMENT

The numeral 10 designates the cover and locator of this invention, hereafter referred to as "cover". The cover 10 is comprised of a tubular member 12 which has a center bore or aperture 14 extending inwardly along the center axis thereof from an open end 16 to a closed end 18. A transverse flange which is preferably circular in shape extends transversely from the closed end 18 of the tubular member 12. The diameter of the flange is preferably two to three times the diameter of the tubular member.

It is important that the operator be able to firmly grasp the cover 10 while it is removed from a grease fitting. To insure that the operator has a firm grasp of the device as it is clasped between his fingers so that the fingers engage the outside surface of the tubular member, an annular arcuate groove 22 is provided in the midsection of the outer surface of the tubular member 12. An alternate form of the invention is shown in FIG. 12 where a knurled surface 24 is imposed on the tubular member of cover 10A. Similarly, in a further alternate form of the invention, a second flange 26 is imposed on the tubular member 10B in spaced relation to the flange 20 so that the fingers can embrace the tubular member inbetween the two flanges.

An alternate form of the invention is shown by the cover 10C in FIG. 10 wherein a colored indicia coding 28 is imposed on the outer surface of flange 20. A symbol comprised of a number or letter 30 can be printed on or otherwise imposed on the coding 28. A hole 32 is provided in the flange of cover 10C to permit a tag 34 to be secured thereto by wire 36 in the event that special instructions need to be written on the tag for a special functional purpose.

A grease fitting 38 is adapted to be received within the bore or aperture 14 of tubular member 12. The numeral 40 designates a conventional bearing in which grease fitting 38 is mounted.

In FIG. 9, an industrial belt conveyor 42 with frame 44, belt 45 and conventional belt rollers 46 is shown. The conventional bearings for the rollers have not been shown. Grease fittings 38A and 38B are shown to be mounted in the frame adjacent to the rollers 46. Covers 10D and 10E identical to cover 10 but of different colors are imposed on the grease fittings of two remaining rollers 46 in FIG. 9.

With reference to FIG. 6, it should be noted that bore or aperture 14 is of constant diameter but is of such diameter that it will tightly receive the head 39 of grease fitting 38. The covers of this invention are preferably comprised of some deformable plastic such as polyethylene or the like which are substantially rigid but which do not have deformable characteristics.

Again with reference to FIG. 6, it should be noted that the axial depth of the aperture 14 is substantially greater than the inserted length of the head 39 of grease fitting 38 so that a substantial air pocket 48 is located between the closed end 18 of the aperture and the head 39. By virtue of the tight fit between the head 39 and the aperture 14, negative air pressure will be produced in pocket 48 when the operator starts to remove the cover 10 from the grease fitting. This negative pressure tends to resist the removal of the cover from the grease fitting. As a result, the air pocket 48 serves to maintain the cover on the grease fitting during normal operation of the device upon which the grease fitting is mounted.

As is implicit from the foregoing, different colored indicia codings 28 can be used as well as different symbols 30. Many different colors of plastic can be used to create distinct differences in the visual appearance of the covers 10, 10D, and 10E, for example.

It is seen that the covers of this invention will effectively keep dust and dirt away from the heads of the grease fittings. The flanges 10 are large enough to create a distinct visual appearance which will completely avoid the lost time consumed in searching for the location of the grease fittings. By using different color codes or different symbols, grease fittings which need attention each 10 days, for example, can be of one color; while grease fitting which need attention only every 30 days can be of another color. This coding can also be coordinated with the use of different symbols 30.

When some special instructions are needed for a given grease fitting, tag 36 can be used as shown in FIG. 10 with the special instructions being written on the tag.

Even if the hands of the operator or greasy, the operator can easily hold the cover 10 in one hand between the index and middle fingers thereof while the grease gun is being operated with both hands. There is little danger of the cover being dropped because of the presence of the annular groove 22, the knurled surface 24 or the use of the second flange 26.

The device will not likely dislodge from the grease fitting because of the vacuum aspects of pocket 48 as described heretofore.

The device of this invention has the principal features of protecting the grease fitting from dust, and providing an effective location means to substantially reduce the continual problem of searching for and servicing the grease fitting. It is seen that this invention will, therefore, achieve its stated objectives.

I claim:

1. The combination of a grease fitting head with a grease fitting cover and locator, comprising,
   an arcuate-shape grease fitting head having a maximum diameter and a longitudinal length,
   a grease fitting cover and locator means comprising a generally cylindrical shaped tubular member having an axially located aperture therein adapted to receive said grease fitting, said aperture being of constant diameter and having a longitudinal length substantially twice the longitudinal length of said grease fitting and a diameter less than that of said maximum diameter of said grease fitting,
   said grease fitting head being completely frictionally inserted into said aperture and creating an air pocket in said aperture having a longitudinal length substantially equal to the longitudinal length of said grease fitting head so that a significant air space will be created beyond the inner end of said grease fitting head to provide a source of negative air pressure and to yieldably resist the removal of said grease fitting cover and locator means from said grease fitting head, and
   an outwardly extending flange on one end of said grease fitting cover and locator means opposite to said air space, said flange having a width at least twice the diameter of said tubular member and being comprised of a bright colored material to facilitate the grasping and visible location of said grease fitting cover and locator means.

* * * * *